United States Patent
Haruna

(10) Patent No.: US 8,023,181 B2
(45) Date of Patent: Sep. 20, 2011

(54) OPTICAL FIBER FOR AMPLIFICATION AND OPTICAL FIBER AMPLIFIER

(75) Inventor: Tetsuya Haruna, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 543 days.

(21) Appl. No.: 12/297,560

(22) PCT Filed: Jan. 16, 2008

(86) PCT No.: PCT/JP2008/050386
§ 371 (c)(1),
(2), (4) Date: Oct. 17, 2008

(87) PCT Pub. No.: WO2008/087953
PCT Pub. Date: Jul. 24, 2008

(65) Prior Publication Data
US 2009/0103171 A1    Apr. 23, 2009

(30) Foreign Application Priority Data
Jan. 19, 2007   (JP) .................................. 2007-010641

(51) Int. Cl.
*H04B 10/17*   (2006.01)
*C03C 13/04*   (2006.01)

(52) U.S. Cl. .................... 359/341.5; 385/141; 501/37
(58) Field of Classification Search ............... 359/341.5; 385/141; 501/37, 50, 53, 54
See application file for complete search history.

(56) References Cited

U.S. PATENT DOCUMENTS

| 4,830,463 | A  * | 5/1989  | Lemaire et al. | ............... 385/123 |
| 6,690,868 | B2 * | 2/2004  | Anderson et al. | ............. 385/123 |
| 7,116,472 | B2 * | 10/2006 | Andrejco et al. | .......... 359/341.5 |
| 2002/0186942 | A1 * | 12/2002 | Bubnov et al. | ................ 385/123 |

(Continued)

FOREIGN PATENT DOCUMENTS

JP   6-268284   9/1994

(Continued)

OTHER PUBLICATIONS

Tomita, A. et al., "Hydrogen-Induced Loss Increases in Germanium-Doped Single-Mode Optical Fibers: Long-Term Predictions," Electronics Letters, U.S.A., Jan. 17, 1985, 21(2), pp. 71-72.

(Continued)

*Primary Examiner* — Mark Hellner
*Assistant Examiner* — Ari M. Diacou
(74) *Attorney, Agent, or Firm* — McDermott Will & Emery LLP

(57) ABSTRACT

Provided is an optical fiber for amplification and an optical fiber amplifier for use in L-band, in which optical fiber the increase of transmission loss and the degradation of hydrogen-resistant characteristic can be restrained. The optical fiber is basically made of silica glass and comprises: a core region doped with erbium and P element of 2 wt % to 5 wt % concentration, Ge not being added thereto; and a cladding region enclosing the core region and doped with F element, wherein the optical fiber has a gain at least in a wavelength range of 1570 to 1620 nm. The optical fiber amplifier comprises: the optical fiber; a pump light source for outputting the pump light capable of exciting a rare-earth element added to the core region of the optical fiber; and an optical coupler for introducing into the optical fiber the pump light having been output from the pump light source.

4 Claims, 5 Drawing Sheets

U.S. PATENT DOCUMENTS

| | | | |
|---|---|---|---|
| 2003/0024276 A1* | 2/2003 | Anderson et al. | 65/390 |
| 2003/0099455 A1* | 5/2003 | Zhang et al. | 385/142 |
| 2003/0182970 A1* | 10/2003 | Sen et al. | 65/390 |
| 2006/0222307 A1* | 10/2006 | Walton et al. | 385/124 |

FOREIGN PATENT DOCUMENTS

| | | |
|---|---|---|
| JP | 2002-072263 | 3/2002 |
| JP | 2002-250848 | 9/2002 |
| JP | 2003-035837 | 2/2003 |
| JP | 2003-086870 | 3/2003 |
| JP | 2003-124547 | 4/2003 |
| JP | 2004-513056 | 4/2004 |
| JP | 2005-101590 | 4/2005 |
| JP | 3690110 | 6/2005 |
| JP | 2006-324420 | 11/2006 |

OTHER PUBLICATIONS

Koyano Y. et al., "Long-Term Reliability of Er-Doped Fibers in Hydrogen Environments," IEICE, Jun. 25, 1995, C-I, Electronics, I-Light/Wave, pp. 289-296.

Uchida N. et al., "Infrared Optical Loss Increase in Silica Fibers due to Hydrogen," IEEE Journal, Lightwave Technology, U.S.A., IEEE, 1986, 4(8), pp. 1132-1138.

Japanese Notification of Reasons for Rejection, w/ English translation thereof, issued in Japanese Patent Application No. JP 2007-010641 dated Jul. 7, 2009.

* cited by examiner

US 8,023,181 B2

OPTICAL FIBER FOR AMPLIFICATION AND OPTICAL FIBER AMPLIFIER

RELATED APPLICATIONS

This application is the U.S. National Phase under 35 U.S.C. §371 of International Application No. PCT/JP2008/050386, filed on Jan. 16, 2008, which in turn claims the benefit of Japanese Application No. 2007-010641, filed on Jan. 19, 2007, the disclosures of which Applications are incorporated by reference herein.

TECHNICAL FIELD

The present invention relates to an optical fiber for amplification and an optical fiber amplifier including the same.

BACKGROUND ART

An optical communication system can transmit and receive large-volume information at high speed by transmitting signal light through an optical fiber transmission line. In the optical communication system, there is a case where signal light of L-band (1565 nm to 1625 nm) is used, as well as a case where signal light of C-band (1530 nm to 1565 nm) is used. Also, the optical communication system is equipped with optical fiber amplifiers arranged along the signal light transmission path so that signal light can be transmitted over a long distance by optically amplifying the signal light.

The optical fiber amplifier is equipped with an optical fiber for amplification and a light source for outputting pump light to be supplied to the optical fiber, where the optical fiber is basically made of silica glass in which the core region is doped with a rare-earth element. In the optical fiber amplifier, the rare-earth element added to the core region of the optical fiber for amplification is excited by the pump light, and accordingly signal light is optically amplified in the optical fiber for amplification.

Optical fiber amplifiers or optical fibers for amplification for optically amplifying L-band signal light are disclosed in Japanese Patent No. 3690110, Japanese translation of PCT Application Publication No. 2004-513056, Japanese Patent Application Publication No. 2003-124547, and Japanese Patent Application Publication No. 2003-086870. In these L-band optical fibers for amplification, their core regions are doped with P-elements in addition to rare-earth elements. Also, in these optical fibers for amplification, Ge elements are added as a refractive index raising agent to the core regions in order to increase the refractive index of the core regions higher than the refractive index of the cladding regions.

In Japanese Patent No. 3690110, it is stated that preferably the concentration of P-element in the optical fiber for amplification is 5 wt % or more, or 8 wt % or more. In Japanese translation of PCT Application Publication No. 2004-513056, it is stated that the $P_2O_5$ concentration in the optical fiber for amplification is equal to or more than 5 wt % and preferably 8 wt % or more. According to Japanese Patent Application Publication No. 2003-124547, the P-element concentration of the optical fiber for amplification is from 1 wt % to 10 wt %. Also, according to Japanese Patent Application Publication No. 2003-086870, the preferable P-element concentration of the optical fiber for amplification is 0.01 mol % or more and 10 mol % or less.

However, according to the finding of the present inventor, these L-band optical fibers for amplification have the following problems. That is, when the concentration of P element is high, the structural defect in the silica glass increases, and consequently the transmission loss increases, resulting in degradation of long-range reliability (particularly hydrogen-resistant characteristic). Furthermore, if Ge element is added, in addition to the P element, to the core region, the transmission loss increases due to the added Ge element, and the hydrogen-resistant characteristic is degraded.

[Patent document 1] Japanese Patent No. 3690110
[Patent document 2] Japanese translation of PCT Application Publication No. 2004-513056
[Patent document 3] Japanese Patent Application Publication No. 2003-124547
[Patent document 4] Japanese Patent Application Publication No. 2003-086870

DISCLOSURE OF INVENTION

Problem to be Solved by the Invention

An object of the present invention is to provide an optical fiber for amplification for use in L-band, in which the increase of transmission loss and the degradation of the hydrogen-resistant characteristic can be restrained, and also to provide an optical fiber amplifier including such optical fiber for amplification.

Means for Solving the Problem to be Solved

To achieve the object, an optical fiber for amplification basically made of silica glass is provided. The core region of this optical fiber for amplification is doped with erbium and P element of 2 wt % to 5 wt % concentration, but Ge is not added thereto, and the cladding region enclosing the core region is doped with F element, and the optical fiber has a gain of optical amplification at least in a wavelength range of 1570 to 1620 nm.

Another aspect of the invention is to provide an optical fiber amplifier which comprises: an optical fiber for amplification of the present invention, the optical fiber being capable of optically amplifying signal light by pump light being supplied thereto; a pump light source for outputting pump light that is capable of exciting a rare-earth element added to the core region of the optical fiber for amplification; and an optical coupler for introducing into the optical fiber for amplification the pump light that has been output from the pump light source.

Figure 1:
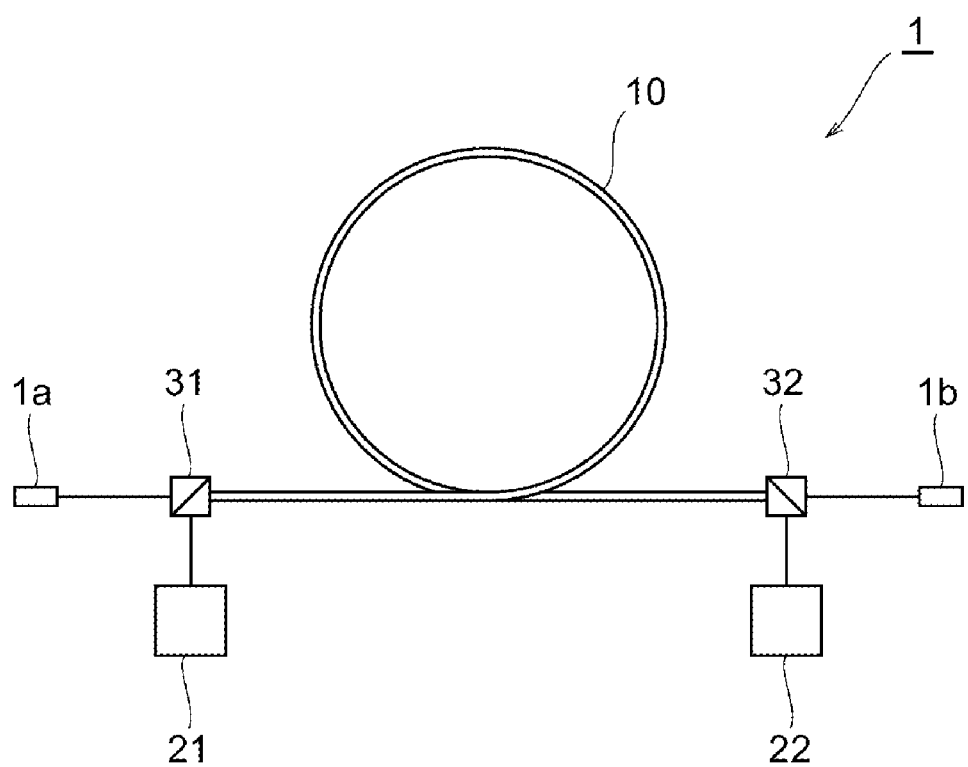
FIG. 1 is a conceptional schematic diagram showing an embodiment of optical fiber amplifier of the present invention.

| Description of Referenced Numerals |
| --- |
| 1 ... optical fiber amplifier, |
| 10 ... optical fiber for amplification, |
| 11 ... core region, |
| 12 ... cladding region, |
| 13 ... carbon layer, |
| 14 ... resin layer, |
| 21, 22 ... pump light source, |
| 31, 32 ... optical coupler. |

BEST MODE FOR CARRYING OUT THE INVENTION

Embodiments of the present invention will be described below, with reference to the drawings. The drawings are provided for the purpose of explaining the embodiments and are not intended to limit the scope of the invention. In the drawings, an identical mark represents the same element so that the repetition of explanation may be omitted. The dimensional ratios in the drawings are not always exact.

FIG. 1 is a conceptional schematic diagram showing an embodiment of optical fiber amplifier of the present invention. The optical fiber amplifier 1, which optically amplifies and outputs from the output end 1b the signal light that has been input to the input end 1a, is equipped with an optical fiber for amplification 10, a pump light source 21, a pump light source 22, an optical coupler 31, and an optical coupler 32.

The optical fiber for amplification 10, which is an optical fiber basically made of silica glass, has a core region and a cladding region surrounding the core region. The refractive index of the core region is higher than the refractive index of the cladding region. The core region is doped with erbium and P elements, but Ge element is not added thereto. The cladding region is doped with F element. The optical fiber for amplification 10 optically amplifies signal light by pump light being supplied thereto. The optical fiber for amplification 10 has a gain of optical amplification at least in a wavelength range of 1570 to 1620 nm.

The pump light sources 21 and 22 output pump light of the 1.48 μm or 0.98 μm wavelength band capable of exciting the erbium element added to the core region of the optical fiber for amplification 10. The optical coupler 31 outputs into the optical fiber for amplification 10 the signal light that has reached from the input end 1a and also outputs into the optical fiber for amplification 10 the pump light that has reached from the pump light source 21. The optical coupler 32 outputs to the output end 1b the signal light that has reached from the optical fiber for amplification 10 and also outputs into the optical fiber for amplification 10 the pump light that has reached from the pump light source 22.

In the optical fiber amplifier 1, the pump light that has been output from the pump light source 21 is introduced into the optical fiber for amplification 10 in the forward direction through the optical coupler 31, and the pump light that has been output from the pump light source 22 is introduced into the optical fiber for amplification 10 in the backward direction through the optical coupler 32. The pump light excites the erbium element added to the core region of the optical fiber for amplification 10. The signal light of L-band that has been input into the input end 1a is optically amplified while it is transmitted through the optical fiber for amplification 10 after having been input to the optical fiber for amplification 10 via the optical coupler 31. The signal light that has optically been amplified and output from the optical fiber for amplification 10 is output from the output end to the outside via the optical coupler 32.

Figure 2:
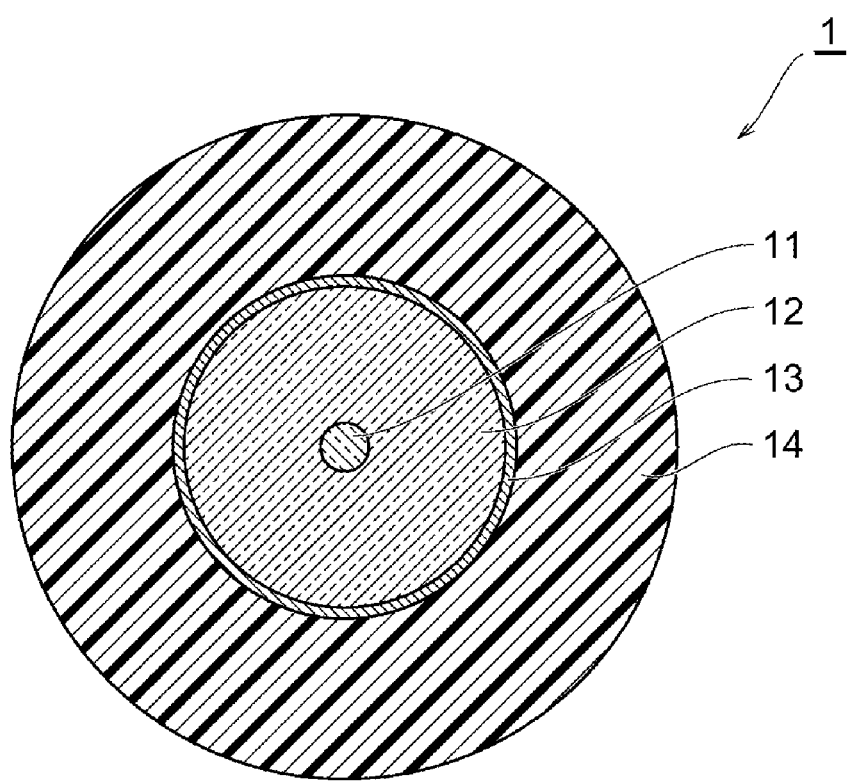
FIG. 2 is a sectional view showing an embodiment of optical fiber for amplification of the present invention.

FIG. 2 is a sectional view showing an embodiment of optical fiber for amplification of the present invention. The optical fiber for amplification 10 comprises a core region 11, a cladding region 12 having a refractive index that is lower than that of the core region 11, a carbon layer 13 provided on the outer circumferential surface of the cladding region 12, and a resin layer 14 provided around the outer periphery of the carbon layer 13. The core region 11 and the cladding region 12 is basically made of silica glass.

The core region 11 is doped with erbium and P elements. The concentration of P element of the core region 11 is from 2 wt % to 5 wt %. Ge is not added to the core region 11. The cladding region 12 surrounding the core region 11 is doped with F element and consequently the refractive index thereof is lower than the refractive index of the core region 11. For example, the outer diameter of the cladding 12 is 123 μm to 126 μm, the thickness of carbon layer 13 is 20 to 60 nm, and the outer diameter of the resin layer 14 is 230 to 260 μm.

The optical fiber for amplification 10 having the core region 11 and cladding region 12 that are composed of such compositions is not only preferable for the purpose of optically amplifying the L-band signal light, but also capable of restraining the increase of transmission loss and the degradation of hydrogen-resistant characteristic. That is, since Er element and P element of 2 wt % or more are added to the core region 11, the optical fiber for amplification 10 can have a gain of optical amplification in the L-band (particularly the wavelength range of 1570 to 1620 nm). Also, since the concentration of P element in the core region 11 is equal to or less than 5 wt %, the increase of the structural defect in the silica glass of the core region 11 can be restrained, and consequently, the increase of the transmission loss of the optical fiber for amplification 10 can be restrained. Furthermore, because the concentration of P element in the core region 11 is equal to or less than 5 wt % and Ge element is not added to the core region 11, the degradation of the hydrogen-resistant characteristic of the optical fiber for amplification 10 can be restrained.

Next, in reference to the Table below and FIGS. 3 to 5, an explanation will be given with respect to the results of evaluating an optical fiber for amplification that is basically made of silica glass and in which Er element and P element are added to the core region. The Table shows, from the left to right columns for each of eight evaluated fibers 1 to 8, in the enumerated order: the average relative refractive index difference of the core region, the diameter of the core region, the compositions of the core region (P element concentration, Ge element concentration, Al element concentration, and erbium element concentration), the composition (F element concentration) of the cladding region, the background loss (transmission loss at a wavelength of 1200 nm), the longest wavelength at which a gain of 70% or more of the maximum gain can be obtained, the splicing loss for connection with a single mode fiber, MAC value (mode field diameter/cutoff wavelength), mode field diameter (MFD), cutoff wavelength (λc), and bend loss at a bend diameter of 30 mmφ at the 1550 nm wavelength.

TABLE

| | | | Compositions | | | | |
|---|---|---|---|---|---|---|---|
| | Average Δn [%] | Diameter of core region [μm] | P element Concentration [wt %] | Ge element Concentration [wt %] | Al element Concentration [wt %] | Er element concentration [wt ppm] | F element Concentration [wt %] |
| Fiber 1 | 1.4 | 4.1 | 0 | 2.7 | 4.9 | 620 | 1.1 |
| Fiber 2 | 0.45 | 7.5 | 1 | 0 | 0.4 | 500 | 1.1 |
| Fiber 3 | 0.55 | 6.5 | 2 | 0 | 0.2 | 900 | 1.1 |
| Fiber 4 | 0.65 | 6.0 | 3 | 0 | 0.3 | 1250 | 1.1 |
| Fiber 5 | 0.85 | 5.1 | 5 | 0 | 0 | 1000 | 1.1 |
| Fiber 6 | 1.1 | 4.5 | 8 | 0 | 0.3 | 2000 | 1.0 |
| Fiber 7 | 1.4 | 4.1 | 11 | 0 | 0.3 | 1350 | 1.0 |
| Fiber 8 | 1.0 | 4.8 | 5 | 2.5 | 0.2 | 850 | 1.1 |

| | | Property | | | | | |
|---|---|---|---|---|---|---|---|
| | Background loss @1200 nm [dB/km] | Gain band (Longest wavelength at which gain of 70% or more of maximum gain can be obtained) [nm] | Splicing loss for connection with SMF [dB] | Mac value [MFD/λc] | MFD [μm] | λc [μm] | Bend loss (30 mmφ, @1.55 μm) [dB/m] |
| Fiber 1 | 5 | 1615 | 0.2 | 4.3 | 5.2 | 1.2 | <0.1 |
| Fiber 2 | 8 | 1618 | 0.4 | 7.5 | 9.0 | 1.2 | 3.6 |
| Fiber 3 | 9 | 1620.5 | 0.3 | 6.2 | 8.0 | 1.3 | 0.1 |
| Fiber 4 | 8 | 1623 | 0.3 | 6.3 | 7.5 | 1.2 | <0.1 |
| Fiber 5 | 15 | 1625 | 0.4 | 4.6 | 6.0 | 1.3 | <0.1 |
| Fiber 6 | 25 | 1626 | 0.4 | 4.6 | 5.5 | 1.2 | <0.1 |
| Fiber 7 | 48 | 1628 | 1.2 | 3.5 | 4.2 | 1.2 | <0.1 |
| Fiber 8 | 27 | 1624 | 0.5 | 5.5 | 6.0 | 1.1 | <0.1 |

Figure 3:
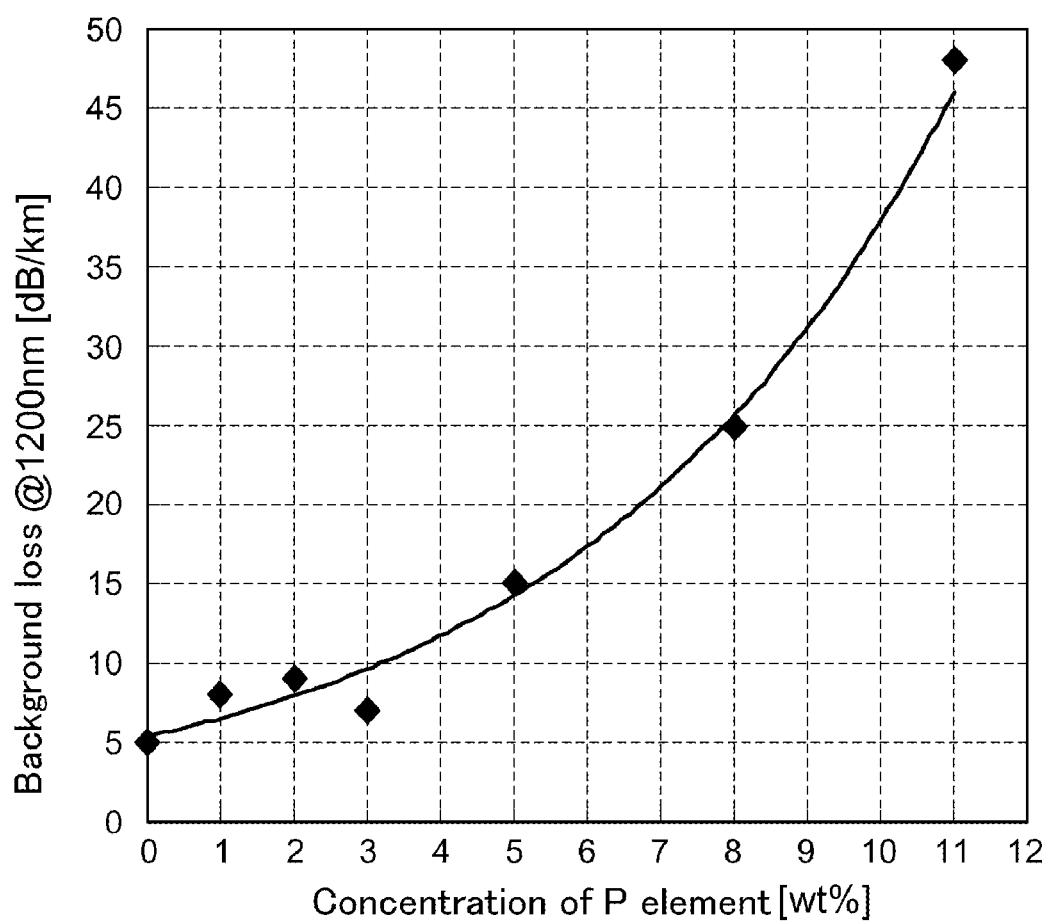
FIG. 3 is a graph showing the relationship between the concentration of P element in the core region and the background loss (transmission loss at a wavelength of 1200 nm).

FIG. 3 is a graph showing the relationship between the concentration of P element in the core region and the background loss. FIG. 3 shows that the background loss increases as the concentration of P element increases. When the concentration of P element is 0 wt %, the transmission loss is about 5 dB/km (@ 1200 nm); however, as the concentration of P element increases, the transmission loss increases. The transmission loss is 25 dB/km (@1200 nm) in the case of a fiber to which P element is added at a concentration of the same level (8 wt %) as shown in Japanese Patent No. 3690110 or Japanese translation of PCT Application Publication No. 2004-513056. In the case of practical use, the transmission loss of a fiber is preferably 20 dB/km or less, and hence it is understood that the concentration of P element must be 5 wt % or less for the purpose of practical use.

Figure 4:
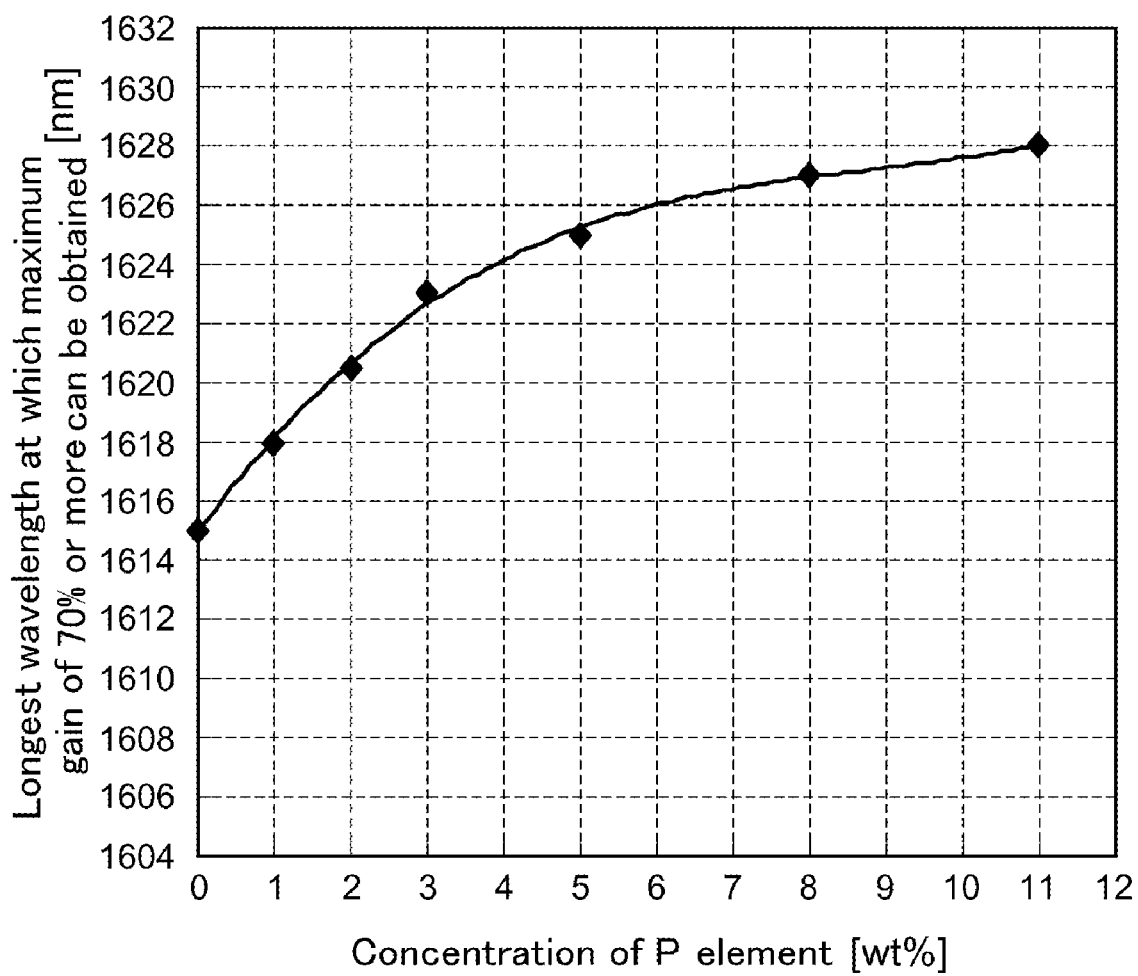
FIG. 4 is a graph showing the relationship between the P-element concentration of the core region and the upper limit of the amplification band (the longest wavelength at which a maximum gain of 70% or more can be obtained).

FIG. 4 is a graph showing the relationship between concentrations of P element of the core region and the upper limit of the amplification band (the longest wavelength at which a maximum gain of 70% or more can be obtained). FIG. 4 shows that the upper limit of the amplification band shifts to the longer wavelength side (that is, the amplification band spreads) as the concentration of P element increases. In order to obtain sufficient gain to the extent of 1620 nm wavelength, it is necessary to make the concentration of P element equal to or more than 2 wt %.

When the concentration of P element is 11 wt %, splicing loss of about 0.8 dB occurs at a fusion-bonding part. Conceivably, this is because when fusion splicing with the single mode fiber was done, a rapid increase of mode field diameter was caused at the fusion-bonding part by the diffusion of P element in the silica glass, and accordingly the discrepancy in mode field diameters occurred. Preferably, the concentration of P element is 8 wt % or less, because it is desirable that the fusion-bonding loss be equal to or less than 1.0 dB in the case of fusion splicing with a single mode fiber.

Figure 5:
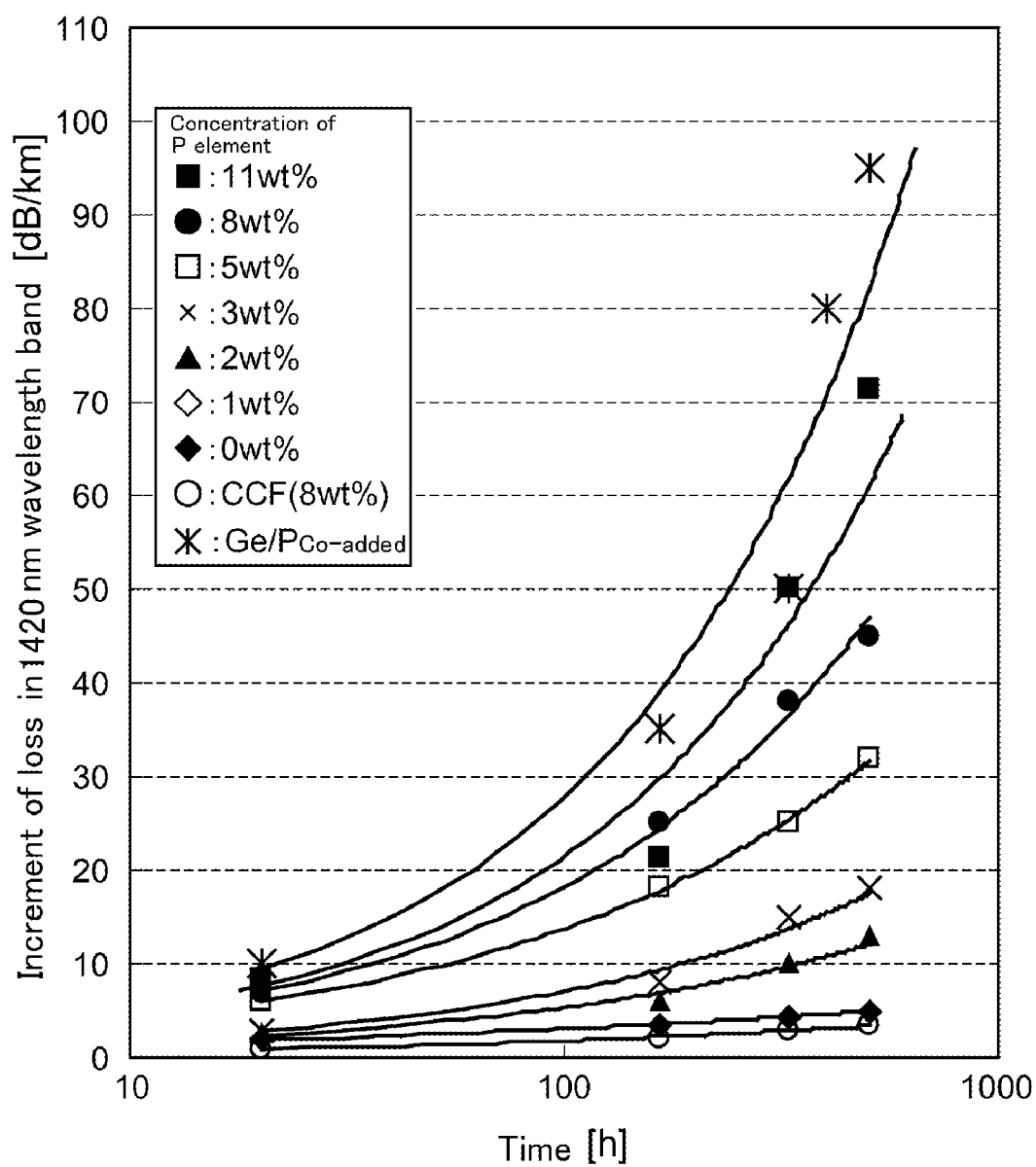
FIG. 5 is a graph showing relations between P-element concentrations of the core region and the hydrogen-resistant characteristics (increases of the loss after the exposure to an atmosphere of 1% hydrogen at 50° C.).

FIG. 5 is a graph showing relations between the concentration of P element of the core region and the hydrogen-resistant characteristic (50° C.×H$_2$: 1%). The abscissa of this graph represents time [hour]. In the case of an optical fiber in which Er element is added to the core region, the loss due to hydrogen conspicuously appears in the 1420 nm wavelength band, and therefore the ordinate was made to represent loss increases [dB/km] relative to the initial stage characteristic in the 1420 nm wavelength band. The condition for measuring the hydrogen-resistant characteristic was 50° C.×H$_2$: 1%. FIG. 5 shows that the transmission loss in the 1420 nm wavelength band increases as the concentration of P element increases. Also, it can be seen that in the case where a carbon layer is provided on the outer circumferential surface of the cladding region, it is possible to obtain hydrogen-resistant characteristic that is equivalent to or better, even when P element is added, as compared with the case where P element is not added. The fiber 8, to which Ge element was added, exhibited poor hydrogen-resistant characteristic.

As can be seen from the above results, by making the concentration of P element to be 2 to 5 wt %, it is made possible to secure an amplification band of up to the 1620 nm wavelength band and to restrain the increase of transmission loss and the degradation of reliability (hydrogen-resistant characteristic). From the viewpoint of the hydrogen-resistant characteristic, it is more preferable to provide a carbon coating.

The present patent application is based on Japanese patent application (Application No. 2007-010641) filed on Jan. 19, 2007, and the contents thereof are incorporated herein as a reference.

INDUSTRIAL APPLICABILITY

The present invention can be applied as an optical fiber for amplification and an optical fiber amplifier for use in L-band.

The invention claimed is:
1. An optical fiber for amplification basically made of silica glass and comprising:
a core region doped with erbium and P element of 2 wt % to 5 wt % concentration, Ge not being added thereto; and a cladding region enclosing the core region and doped with F element, wherein the optical fiber has a gain of optical amplification at least in a wavelength range of 1570 to 1620 nm.

2. An optical fiber for amplification according to claim 1, wherein the fusion-bonding loss is equal to or less than 1.0 dB in the case of fusion splicing with a single mode fiber.

3. An optical fiber for amplification according to claim 1, wherein a carbon layer is provided on the outer circumferential surface of the cladding region.

4. An optical fiber amplifier comprising:

an optical fiber for amplification according to claim 1, the optical fiber being capable of optically amplifying signal light by pump light being supplied thereto;

a pump light source for outputting the pump light capable of exciting a rare-earth element added to the core region of the optical fiber for amplification; and an optical coupler for introducing into the optical fiber for amplification the pump light having been output from the pump light source.

* * * * *